United States Patent
Hinz

(10) Patent No.: US 8,321,652 B2
(45) Date of Patent: Nov. 27, 2012

(54) PROCESS AND METHOD FOR LOGICAL-TO-PHYSICAL ADDRESS MAPPING USING A VOLATILE MEMORY DEVICE IN SOLID STATE DISKS

(75) Inventor: Torsten Hinz, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 725 days.

(21) Appl. No.: 12/184,837

(22) Filed: Aug. 1, 2008

(65) Prior Publication Data

US 2010/0030999 A1   Feb. 4, 2010

(51) Int. Cl.
*G06F 12/00* (2006.01)

(52) U.S. Cl. ............. 711/206; 711/5; 711/103; 711/104

(58) Field of Classification Search ............... 711/5, 103, 711/104, 202, 206
See application file for complete search history.

(56) References Cited

U.S. PATENT DOCUMENTS

| | | |
|---|---|---|
| 2006/0262644 A1 | 11/2006 | Schoepf et al. |
| 2007/0276996 A1 * | 11/2007 | Caulkins et al. ............. 711/113 |
| 2008/0010431 A1 | 1/2008 | Chang et al. |
| 2008/0177937 A1 | 7/2008 | Nishihara et al. |
| 2009/0198947 A1 * | 8/2009 | Khmelnitsky et al. ........ 711/202 |

FOREIGN PATENT DOCUMENTS

| | | | |
|---|---|---|---|
| WO | WO 2007/058617 A1 | 5/2007 |
| WO | WO 2008/077285 A1 | 7/2008 |

\* cited by examiner

*Primary Examiner* — Hong Kim
(74) *Attorney, Agent, or Firm* — Slater & Matsil, L.L.P.

(57) ABSTRACT

An embodiment of the invention relates to a mass storage device including a nonvolatile memory device with a plurality of memory management blocks and an address translation table formed with pointers to locations of the memory management blocks. A volatile memory device is included with an address index table formed with pointers to the pointers to the locations of the memory management blocks. The address index table is stored in the nonvolatile memory upon loss of bias voltage. Changes to the address translation table are accumulated in the volatile memory and written to the address translation table when at least a minimum quantity of the changes has been accumulated. The changes to the logical block address translation table accumulated in the volatile memory are written to a page in the address translation table after prior data in the page has been updated, written to another page, and then erased.

16 Claims, 3 Drawing Sheets

PROCESS AND METHOD FOR LOGICAL-TO-PHYSICAL ADDRESS MAPPING USING A VOLATILE MEMORY DEVICE IN SOLID STATE DISKS

TECHNICAL FIELD

An embodiment of the invention relates generally to mass storage devices and methods, and more particularly to combining a nonvolatile memory device with a memory device that can be more easily overwritten to provide a nonvolatile memory device with improved access to and storage of digital data.

BACKGROUND

Mass storage memory devices such as flash cards, USB ("universal serial bus") sticks, or solid-state disks use flash semiconductor structures to store data in a nonvolatile memory device. A nonvolatile memory device refers to a memory device for which a power source can be switched "off" without losing the contents of the memory. Nonvolatile memory devices include flash memory devices that may semi-permanently retain an electric charge to represent one or more bits, or a "hard disk" (also referred to as a "hard drive") that may a semi-permanently retain a magnetic charge to store one or more bits. Semiconductor devices such as SRAMs (static random access memories) and DRAMs (dynamic random access memories) are referred to as volatile memory devices because they lose the contents of their memories if a bias voltage source is switched off. A bias voltage source includes, without limitation, a power converter coupled to an electrical source of power or a battery that may be located internal or external to the memory device.

Today's magnetic-based mass storage devices such as floppy disks or hard disks are organized in so-called sectors (a sector of being a portion of a "track" in the disk), each sector typically storing 512 bytes (in magnetic disks), and each sector identified with an individual logical block address (LBA). An LBA is a logical addressing scheme wherein a fixed one-to-one relationship is established between a sector of data and the physical location on the disk in which the respective sector of data is stored. The operating system of a computer collectively handles the LBAs of the mass storage device and builds a file system based thereon. The computer operating system reads and writes sequential amounts of LBAs with different block sizes from and to the mass storage device. In a hard disk, data can be freely written, read, or rewritten one or more sectors at a time.

Unlike magnetic memory devices, in flash memory devices there are some restrictions regarding reading and writing of data. Flash memory devices are organized in pages (typically of size 4 kB (kilobytes) plus data protection headroom) and in erase blocks (also referred to herein as a "block") for example, an erase block of size 64 pages. Accordingly, a 4 kB page of flash memory can store eight 512-byte sectors. A page of flash memory that is not programmed, i.e., a page that does not already contain data, can be written only as an entire page. Similarly, data can be read one page at a time. Flash memory has a further restriction in that it can be erased only a block at a time. Thus, to rewrite selected data in a portion of memory, an entire block must be read, erased, the new data merged with the previous data, and the merged data rewritten as a block. Data can thus not be overwritten except as an entire block. Writing and rewriting is generally referred to as programming. In a typical (NAND structured) flash memory, a page is written to all 1's to erase previously stored data, and can then be rewritten with the intended data. In addition, a block of data is typically written to a different physical portion of the flash memory device to alleviate a wear-out problem associated with repetitively storing data in the same memory location in such devices. A translation table stored in nonvolatile memory of the flash memory device is thus required in the communication link with a host computer to logically associate a sector of data with its physical location, which is generally moved each time it is rewritten. The restrictions of reading, writing, and rewriting in a flash memory device are also applicable to the translation table stored therein.

Due to the limitations of writing to flash memory devices described above wherein each write access requires a readout of an entire erase block, doing the erase and merging operations, and then writing the entire block back to a new location with the merged data, a fixed mapping of the LBAs to physical flash memory addresses is inadequate for managing data stored in such devices. In the ordinary operation of a host computer, there are typically small amounts of data that are required to be copied and merged into a new flash memory device location. Therefore a mapping table (an LBA translation table) must be constructed and managed to track which LBA has been stored to which flash memory device address. It is important that this logical-to-physical address translation table is stored by some means in the nonvolatile flash memory device to enable quick access to the data therein immediately after power up. Since there can be unexpected power-down scenarios, a means for table recovery from nonvolatile stored data should be provided.

Thus, there is a need for a process and related method to construct and manage a translation table stored in nonvolatile memory of a flash memory device that allows transfer of data from a host computer to the flash memory device that avoids the inefficiencies of conventional processes, and that can preserve the integrity of such a table during an interruption of a bias voltage source.

SUMMARY OF THE INVENTION

In accordance with an exemplary embodiment, a mass storage device and a related method are provided. In an embodiment, the mass storage device is constructed with a plurality of memory management blocks, and a logical block address translation table is formed with pointers to locations of the memory management blocks. The mass storage device further includes a second memory device constructed with a logical block address index table. The logical block address index table is formed with logical block address index table pointers to the pointers to the locations of the memory management blocks. In an embodiment, the second memory device is a volatile memory device including a battery coupled to the second memory device to power the second memory device upon loss of a bias voltage coupled to the mass storage device. In an embodiment, changes to the logical block address translation table are accumulated in the second memory device and written to the logical block address translation table when at least a minimum quantity of the changes has been accumulated. In an embodiment, changes to the logical block address translation table accumulated in the second memory device are written to a new page in the logical block address translation table after data in an old page has been updated. The old page is then erased. In an embodiment, the logical block address translation table is sized to store a number of pages larger than a minimum number of pages required to contain the pointers to the locations of the memory management blocks.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

Figure 1:
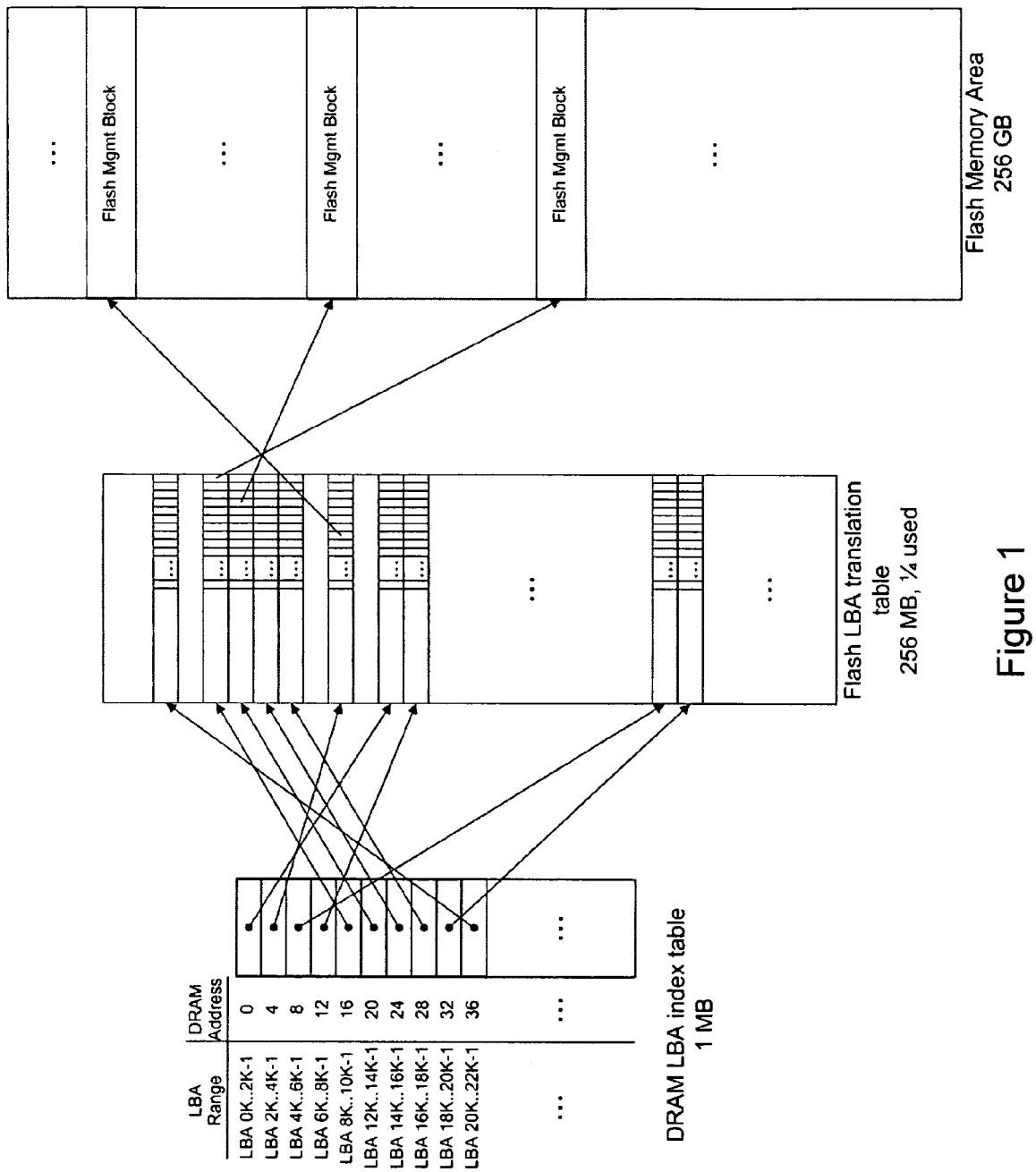
FIGS. 1 and 2 illustrate a block diagrams of memory file structures of a mass storage device, constructed according to an exemplary embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a mass storage device including a volatile memory device and a nonvolatile memory device to provide a nonvolatile memory device with improved storage performance.

An embodiment of the invention may be applied to a mass storage device, for example, to a solid-state drive formed with a flash memory device. Other mass storage devices can be constructed that include a memory device that can be readily overwritten with a nonvolatile memory device as introduced herein in different contexts using inventive concepts described herein, for example, a solid-state memory stick for a digital camera. A typical volatile memory device can be readily overwritten, such as an SDRAM (synchronous dynamic random access memory), which can be overwritten one word at a time. However, an embodiment may also be constructed with a nonvolatile memory device that can be readily overwritten.

A conventional algorithm of semiconductor mass storage device such as a flash memory device uses a mapping table stored in a well-defined location of the flash memory. An LBA number is used as an address index inside this mapping table to find the flash memory device address pointer indicating where this LBA is stored. This ensures that only one or two flash memory device pages must be read for the logical-to-physical address translation process during a read operation.

An advantage of this approach is that the mapping table is always consistent and resistant against unforeseen power-down events. A disadvantage is that an address pointer update within the mapping table results in additional copy-back operations to keep the mapping table index scheme consistent for an entire address pointer range. In a worst case each page program operation for data to be stored causes a page program operation of the corresponding part of the mapping table. This doubles the number of write operations, reduces the overall write performance, and can lead to deadlock situations wherein there is insufficient free memory to complete a data storage and an associated mapping table update operation.

A mass storage device, for example an SSD ("solid-state drive"), in an embodiment advantageously collects modifications of the mapping table in an internal volatile buffer within the solid-state memory device so that the flash memory can be programmed at once. Therefore, the ratio of page program requests due to data writes versus page program requests due to mapping table update writes is much less than two as described for the conventional algorithm mentioned above. Using a small amount of a volatile memory (for example, a DRAM such as an SDRAM) with a garbage collection strategy gives similar performance for doing the LBA-to-physical memory address translation. Garbage collection refers to freeing up previously used areas of nonvolatile memory by collecting valid pages from blocks containing invalid pages into a new block with few or no invalid pages in a spare area of memory, and updating corresponding entries in the translation table to identify the new physical location for the data. Garbage collection can often be performed in the background or during an idle time for the memory device.

Today's SSDs typically include a volatile memory such as an SDRAM for the purpose of caching write data for performance improvement. In an embodiment, a small portion of this SDRAM is used for an index table for a portion of the logical-to-physical address translation, while still storing the entire logical-to-physical address translation table in non-volatile memory.

A translation table contains LBA entries and corresponding flash memory addresses where data are stored. When data in the flash memory are to be overwritten or otherwise added to an existing page, the corresponding LBA entries are updated in the translation table. A spare area of the flash memory, such as 10%, is used for overwriting and adding new data. As new or modified data is stored in the flash memory, they are written to the spare area. Pages previously stored in the flash memory containing previous or otherwise expired data are marked as invalid in the translation table. As the spare area becomes full, particularly as a block of memory accumulates a number of invalid pages, it becomes a candidate for erasing in a garbage collection process. Recall that a block of memory is erasable, not just an individual page.

The translation table in the flash memory has the same problem. Entries therein cannot be overwritten except on a block basis. A copy and merge operation must be performed on remaining data so that it can be written to a new location. A garbage collection process also must be performed on the old translation table pages. Due to the frequently repeating nature of this process for a translation table, it is important that it be performed efficiently.

Turning now to FIG. 1, illustrated is a memory file structure of an SSD, illustrating an embodiment of the mapping process. The principal flash memory area of the device is shown on the right side of the figure, including flash management blocks distributed across the flash memory area. In an exemplary embodiment, a flash management block includes eight pages, and each page includes eight sectors. The memory sizes shown in the figure are exemplary sizes for an SSD device with a total of 256 GB of flash memory storage capability.

The LBA translation table, also stored in flash memory of the SSD, is shown in the central portion of the figure. Pointers associate translation table entries with corresponding flash management blocks in the right portion of the figure.

A DRAM LBA index table is shown in the left portion of the figure with pointers to corresponding entries in the flash LBA translation table. An SSD ordinarily includes a DRAM to cache/buffer data between the SSD and a host computer during a read or write operation. A small portion of the DRAM is used in an embodiment to store a portion of the translation table. In an embodiment, a small battery is included in the SSD to eliminate the effect of volatility of the data in the DRAM portion of memory.

To illustrate an exemplary flash memory read operation, a host computer chooses to read a particular LBA sector. The SSD controller calculates a DRAM address for the LBA index table, which points to a page address in the LBA translation table. Recall that the LBA translation table is stored in the flash memory area of the SSD. A further pointer in the LBA translation table points to the associated flash management block to identify where the requested sector is stored. The corresponding page is read, and transferred to the host computer.

Only a small LBA index table is stored in a DRAM. The LBA table points to a larger table stored in flash memory. For the exemplary 256 GB flash memory device, a 64 MB flash LBA translation table is needed. However, four times this memory is allocated for the flash LBA translation table to accommodate rewriting of pages and blocks. A memory factor different from four for the size of the flash LBA translation table may alternatively be employed.

Thus, to change one sector of the LBA translation table, a copy and merge operation must be performed on a whole block of data. As a result, a trade-off must be made for the size of the flash management block and the amount of data that is typically copied and merged. A smaller flash management block results in fewer copy and merge operations but a greater garbage collection effort.

The data managed in flash management blocks are preferably, without limitation, of size 32 kB each (512 bytes per sector, 8 sectors per page, 8 pages) for the exemplary 256 GB device. The exemplary logical-to-physical block address translation table stored in the flash memory device has table entries each with 32 pointers to flash management blocks (each block containing 8 pages of 8 sectors=32 sectors per block) contained within the flash memory device. With four bytes per pointer, the minimum size for each translation table entry is 128 bytes. To provide spare memory area for sideband information such as a time stamp and a logical block address, the translation table entries are enhanced to the size of 256 bytes. An SSD device with 256 GB has 8.3 million flash management blocks of 32 kB each and therefore 256 k (i.e., 262,144) table entries. So the logical-to-physical block address translation table total size is at least 64 MB. In the example illustrated in FIG. 1, the table is enlarged by factor of four. This means three quarters of the table entries are free or invalid. As previously described, an invalid table entry refers to a previously written entry, the data of which has been abandoned because it has been merged or otherwise updated with new data and written to a new location.

To address the 256 k table entries, the same number of pointers is necessary. With each pointer having 4 bytes, a total of about 1 MB is required for the pointers. These pointers are stored in a memory of the SSD device that can be easily overwritten, for example, in a volatile memory such as an SDRAM.

Figure 2:
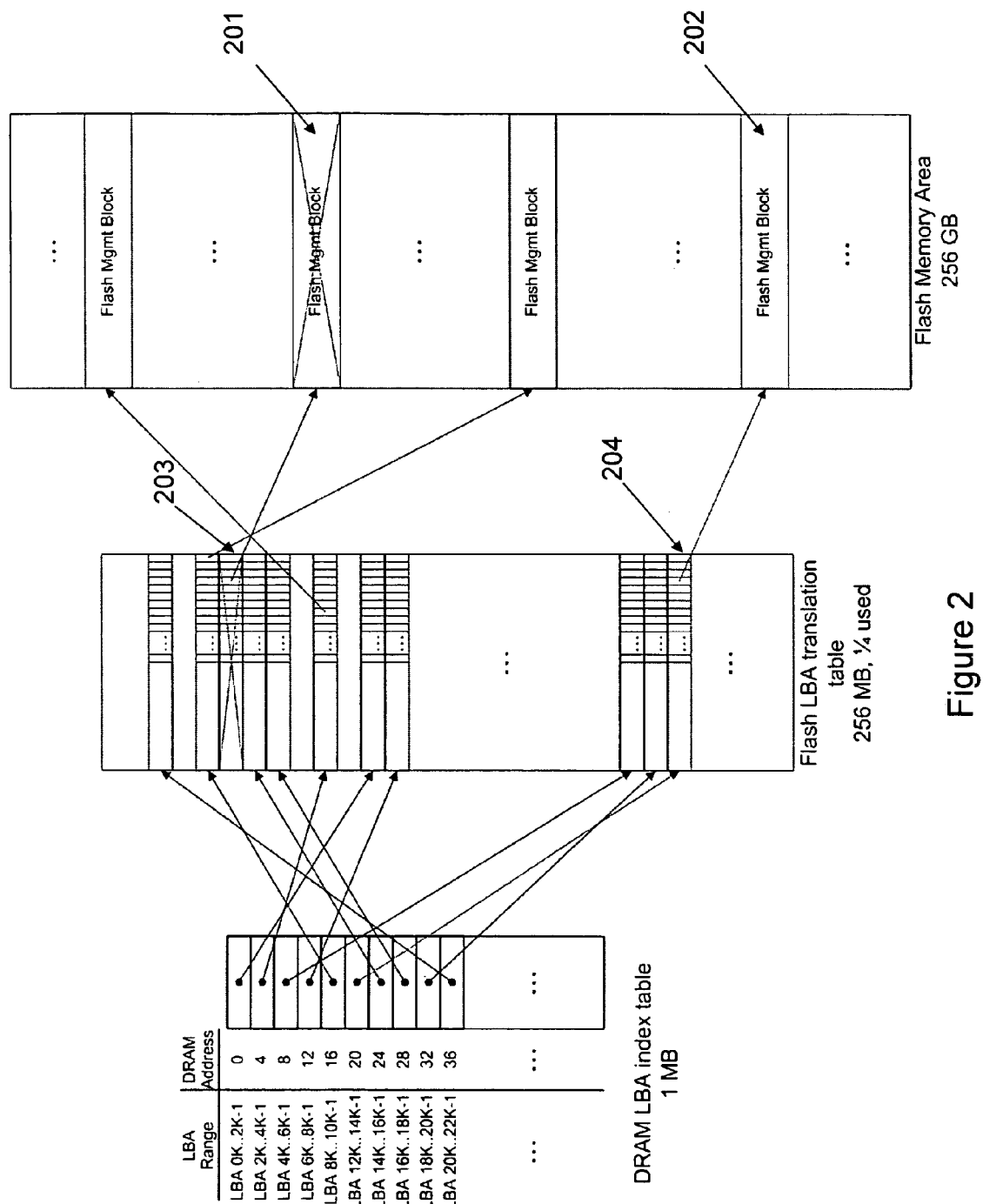

Turning now to FIG. 2, illustrated is the memory file structure of the SSD described with reference to FIG. 1, illustrating a change of the logical-to-physical mapping, in accordance with an embodiment. The figure illustrates a write operation to one of several sectors stored in the flash memory area, the sector referenced by flash management block 201. The data to be stored in the SSD device is copied and merged in units of flash management blocks. The logical-to-physical block address translation table entry containing the translation information of the associated LBAs is taken, modified, and appended to the end of the logical-to-physical block address translation table. In particular, the data in LBA translation table entry 203 is updated and written to a new/free translation table location 204. The pointer in the DRAM index table is correspondingly updated to point to the new LBA translation table location. The LBA translation table entry 203 is now invalid. Finally the pointer in the DRAM is updated with a simple write access. Thus, new and old data are merged and copied to a new memory location referenced by new flash management block 202.

For a read operation, the SSD needs to access the table in the DRAM according to the requested LBAs, obtain an address pointer with the location of the requested table entry in the LBA translation table, and do the read page operation of this table entry to perform the logical-to-physical address translation.

Instead of appending the modified table entries directly to the flash memory, they are collected in a buffer, preferably the DRAM buffer. Finally, when the buffer has accumulated the data of a single page, the buffer is programmed into the flash memory device. This ensures, for this example that a table-entry program operation is done after 32 copy and merge operations of flash management blocks.

A garbage collection function must be performed on the flash LBA translation table to free up invalid translation table entries, particularly during idle times of the SSD device, despite the LBA translation table preferably being four times larger than the amount of data ordinarily expected to be stored therein. The LBA translation table will ordinarily quickly become filled with invalid page entries. The erase blocks used for the logical-to-physical address translation table will have, on average, one-quarter valid table entries and three quarters invalid table entries. Therefore good erase block candidates can be found where most of the table entries are already marked as invalid. An erase block with many invalid pages can be efficiently overwritten with one integrated write operation, thereby reducing the number of pages that must be separately copied, merged, and rewritten to many blocks. The garbage-collection process can copy out the remaining valid table entries, append them to the end of the table, modify the SDRAM index table entries accordingly, and erase the erase block so that a new erase block can be appended to the table for programming. This process ensures that there is always enough space for appending table entries at the end of the table, thereby avoiding a deadlock situation.

DRAM entries, of course, can be directly overwritten. The DRAM is used only for a small part of the indexing process, and can therefore be performed efficiently.

A caution must be observed, however to protect the memory of the DRAM, which is ordinarily a volatile semiconductor memory element, but may be a nonvolatile semiconductor memory element using a prospective technology that accommodates storage of data a byte at a time without the need to erase data in blocks. An accidental disconnect of power from a host computer or removal of an SSD from its socket without an operating system release could erase the memory of the DRAM. Accordingly a power holdover means such as a small battery or other energy storage device must be provided to enable the SSD controller to write the contents of the DRAM to the nonvolatile flash memory upon removal of an external power source. A holdover time in the order of a couple hundred milliseconds can advantageously enable the SSD controller to perform a nonvolatile write operation, enabling the contents of the DRAM to be recovered when the system is repowered. The DRAM for the exemplary 256 GB SSD need only be about 1 MB to store 256 k four-byte pointers for the LBA translation table, which can be quickly recover from the 256 MB LBA translation table when the system is repowered. An alternative means to recover data that might be lost in the DRAM upon removal of power is to reconstruct the LBA index table from data in the LBA translation table, which is also a small table in comparison to the memory size of the SSD.

Figure 3:
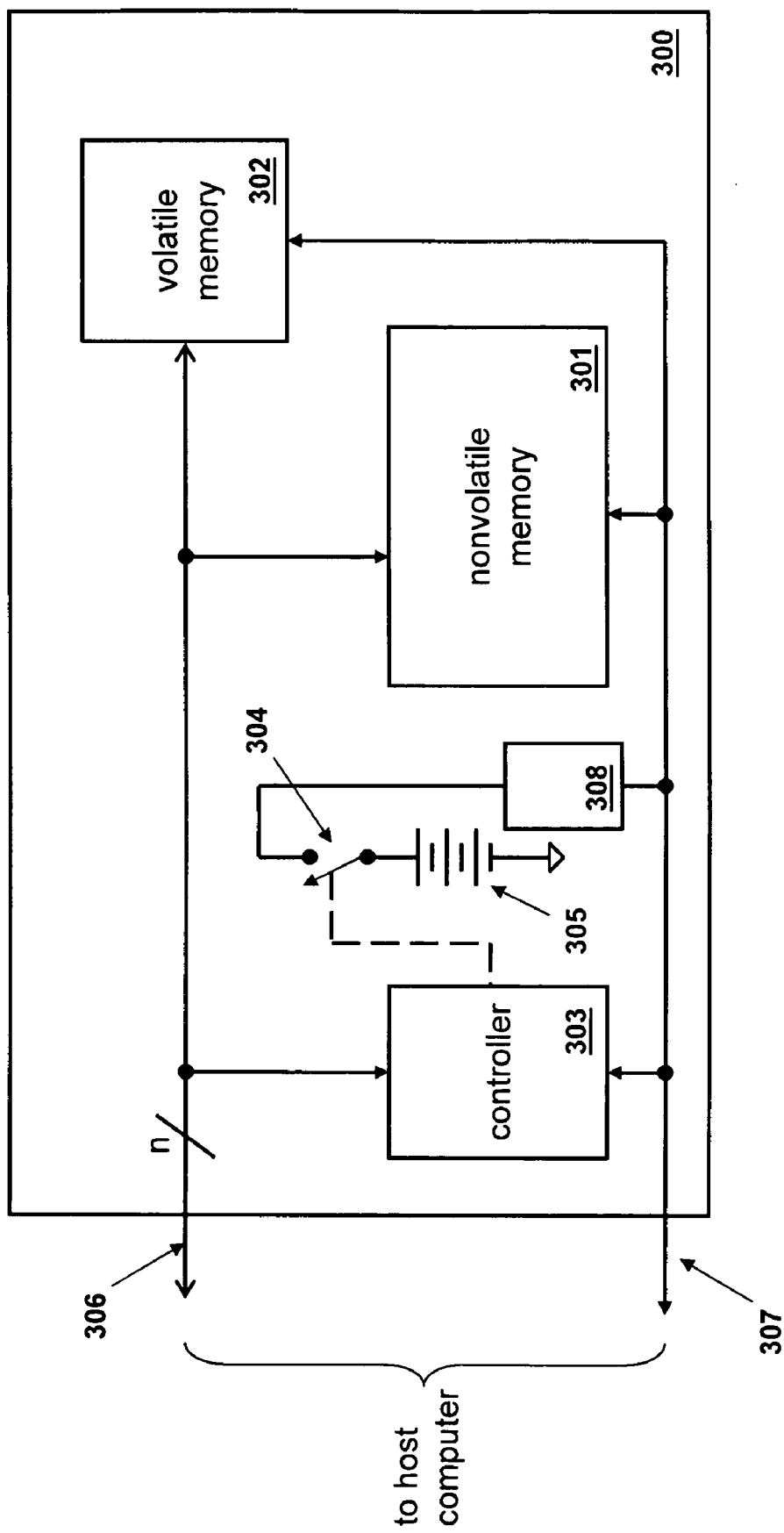
FIG. 3 illustrates a block diagram of a mass storage device, constructed according to an exemplary embodiment.

Turning now to FIG. 3, illustrated is a representative block diagram of a mass storage device 300, constructed according to an embodiment. The mass storage device includes nonvolatile memory 301 coupled through an n-bit wide data line 306 to a host computer (not shown). The nonvolatile memory is also coupled to a voltage source in the host computer by the line 307. The line 307 may include a plurality of conductors to complete a powering circuit from the host computer. The mass storage device further includes a volatile memory 302 such as an SDRAM coupled to the nonvolatile memory and to controller 303. The volatile memory 302 represents a memory that can be easily overwritten, such as one word at a time. A battery 305 is included in the mass storage device to enable the controller 303 to transfer data from volatile memory 302 to the nonvolatile memory 301. A future memory in place of volatile memory 302 may be a nonvolatile memory that can be easily overwritten, thereby avoiding the need for a battery. The battery 305 is coupled to the line 307 through switch 304 and battery charge control device 308 to enable the battery to power the controller, the volatile memory, and the nonvolatile memory during periods of absence of power from the host computer. For example, if the power source for the host computer is disabled, or if the mass storage device is improperly disconnected from the host computer, the controller 303 can close switch 304 to enable the battery to provide power to the mass storage device so that data can be transferred from the volatile memory to the nonvolatile memory. The controller can open switch 304 after the data are transferred. In this manner, sensitive data contained in the volatile memory can be protected in the event of loss of power from the host computer, and without substantial discharge of energy from the battery.

The concept has thus been introduced of constructing a mass storage device with a nonvolatile memory device, wherein the mass storage device is constructed with a plurality of memory management blocks, and a logical block address translation table formed with pointers to locations of the memory management blocks. The mass storage device further includes a second memory device constructed with a logical block address index table. In an embodiment, the logical block address index table is formed with logical block address index table pointers to the pointers to the locations of the memory management blocks. In an embodiment, the mass storage device is configured to store and to read data as pages in the nonvolatile memory device, and to erase blocks of the pages in the nonvolatile memory device. In a further embodiment, the mass storage device is configured to store data as pages in previously erased pages in the nonvolatile memory device.

In an embodiment, the second memory device is a volatile memory device including a battery coupled to the second memory device to power the second memory device upon loss of a bias voltage coupled to the mass storage device.

In an embodiment, the mass storage device further includes a controller coupled to the nonvolatile memory device and to the second memory device, and the controller is configured to store the logical block address index table in the nonvolatile memory device upon loss of a bias voltage coupled to the mass storage device. In an embodiment, changes to the logical block address translation table are accumulated in the second memory device and written to the logical block address translation table when at least a minimum quantity of the changes has been accumulated. In an embodiment, storage of new data in the nonvolatile memory device produces the changes to the logical block address translation table. The changes to the logical block address translation table accumulated in the second memory device are written to a page in the logical block address translation table after prior data in the page has been updated, written to another page, and then erased.

In an embodiment, the logical block address translation table is sized to store a number of pages at least twice a minimum number of pages required to contain the pointers to the locations of the memory management blocks Another exemplary embodiment provides a method of constructing a mass storage device. In an embodiment, the method includes constructing a nonvolatile memory device, partitioning the nonvolatile memory device into a plurality of memory management blocks and a logical block address translation table, and forming pointers to locations of the memory management blocks in the logical block address translation table. The method further includes constructing a second memory device, forming a logical block address index table in the second memory device, and forming pointers in the logical block address index table to the pointers to the locations of the memory management blocks.

In an embodiment, data is stored and read as pages in the nonvolatile memory device, and the data is erased as blocks of the pages in the nonvolatile memory device. The method further includes storing the data in the pages of the previously erased pages in the nonvolatile memory device.

In an embodiment, the second memory device is a volatile memory device. The method further includes coupling a battery to the second memory device to power the second memory device upon loss of power from a bias voltage source.

In an embodiment, the method further includes coupling a controller to the nonvolatile memory device and to the second memory device, and configuring the controller to store the logical block address index table in the nonvolatile memory device upon loss of a bias voltage source coupled to the mass storage device.

In an embodiment, the method further includes accumulating changes to the logical block address translation table in the second memory device, and writing the accumulated changes to the logical block address translation table when at least a minimum quantity of the changes has been accumulated. In an embodiment, storage of data in the nonvolatile memory device produces the changes to the logical block address translation table. The changes to the logical block address translation table accumulated in the second memory device are written to a page in the logical block address translation table after data in a previously written page in the logical block address translation table has been updated, erased from the previously written page, and written to another page in the logical block address translation table.

In an embodiment, the logical block address translation table is sized to store a number of pages of data that is at least twice a minimum number of pages required to contain the pointers to the locations of the memory management blocks.

Although a mass storage device and related methods has been described for application to digital data systems, it should be understood that other applications of a mass storage device, such as cellular telephony and entertainment systems, are contemplated within the broad scope of the invention and need not be limited to digital data system applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A mass storage device, comprising:
    a nonvolatile memory device comprising
        a plurality of memory management blocks,
        a logical block address translation table comprising pointers to locations of the memory management blocks; and
    a volatile memory device comprising a logical block address index table, the logical block address index table comprising logical block address index table pointers to the pointers to the locations of the memory management blocks, wherein the volatile memory device is configured to accumulate a minimum quantity of changes to the logical block address translation table before these changes are written to the logical block address translation table.

2. The mass storage device as claimed in claim 1, further configured:
    to store and to read data as pages in the nonvolatile memory device; and
    to erase blocks of the pages in the nonvolatile memory device.

3. The mass storage device as claimed in claim 2, wherein the mass storage device is further configured to store data as pages in previously erased pages in the nonvolatile memory device.

4. The mass storage device as claimed in claim 1, further including a battery coupled to the volatile memory device to power the volatile memory device upon loss of a bias voltage coupled to the mass storage device.

5. The mass storage device as claimed in claim 1, further including a controller coupled to the nonvolatile memory device and to the volatile memory device, the controller configured to store the logical block address index table in the nonvolatile memory device upon loss of a bias voltage coupled to the mass storage device.

6. The mass storage device as claimed in claim 1, wherein storage of new data in the nonvolatile memory device produces the changes to the logical block address translation table.

7. The mass storage device as claimed in claim 1, wherein the changes to the logical block address translation table accumulated in the volatile memory device are written to a page in the logical block address translation table after prior data in the page has been updated, written to another page, and then erased.

8. The mass storage device as claimed in claim 1, wherein the logical block address translation table is sized to store a number of pages at least twice a minimum number of pages required to contain the pointers to the locations of the memory management blocks.

9. A method of constructing a mass storage device, the method comprising:
    constructing a nonvolatile memory device;
    partitioning the nonvolatile memory device into a plurality of memory management blocks and a logical block address translation table;
    forming pointers to locations of the memory management blocks in the logical block address translation table;
    constructing a volatile memory device;
    forming a logical block address index table in the volatile memory device; and
    forming pointers in the logical block address index table to the pointers to the locations of the memory management blocks;
    accumulating changes to the logical block address translation table in the volatile memory device; and
    writing the accumulated changes to the logical block address translation table when at least a minimum quantity of the changes has been accumulated.

10. The method as claimed in claim 9, wherein:
    data is stored and read as pages in the nonvolatile memory device; and
    the data is erased as blocks of the pages in the nonvolatile memory device.

11. The method as claimed in claim 10, further including storing the data in pages of previously erased pages in the nonvolatile memory device.

12. The method as claimed in claim 9, further comprising coupling a battery to the volatile memory device to power the volatile memory device upon loss of power from a bias voltage source.

13. The method as claimed in claim 9, further comprising:
    coupling a controller to the nonvolatile memory device and to the volatile memory device; and
    configuring the controller to store the logical block address index table in the nonvolatile memory device upon loss of a bias voltage source coupled to the mass storage device.

14. The method as claimed in claim 9, wherein storage of data in the nonvolatile memory device produces the changes to the logical block address translation table.

15. The method as claimed in claim 9, further including writing the changes to the logical block address translation table accumulated in the volatile memory device to a page in the logical block address translation table after data in a previously written page in the logical block address translation table has been updated, erased from the previously written page, and written to another page in the logical block address translation table.

16. The method as claimed in claim 9, further including sizing the logical block address translation table to store a number of pages of data that is at least twice a minimum number of pages required to contain the pointers to the locations of the memory management blocks.

* * * * *